Sept. 7, 1965   J. M. SAVINO ETAL   3,205,141
SIMULATED FUEL ASSEMBLY
Filed May 31, 1963   4 Sheets-Sheet 1

INVENTOR
JOSEPH M. SAVINO
CHESTER D. LANZO

BY
*G. D. O'Brien*
*Gene E. Shook*
ATTORNEYS

Sept. 7, 1965  J. M. SAVINO ETAL  3,205,141
SIMULATED FUEL ASSEMBLY
Filed May 31, 1963  4 Sheets-Sheet 2

INVENTORS
JOSEPH M. SAVINO
CHESTER D. LANZO

BY

*GD O'Brien*
*Gene E. Shook*

ATTORNEYS

INVENTORS
JOSEPH M. SAVINO
BY CHESTER D. LANZO
ATTORNEYS

Sept. 7, 1965 J. M. SAVINO ETAL 3,205,141
SIMULATED FUEL ASSEMBLY
Filed May 31, 1963 4 Sheets-Sheet 4
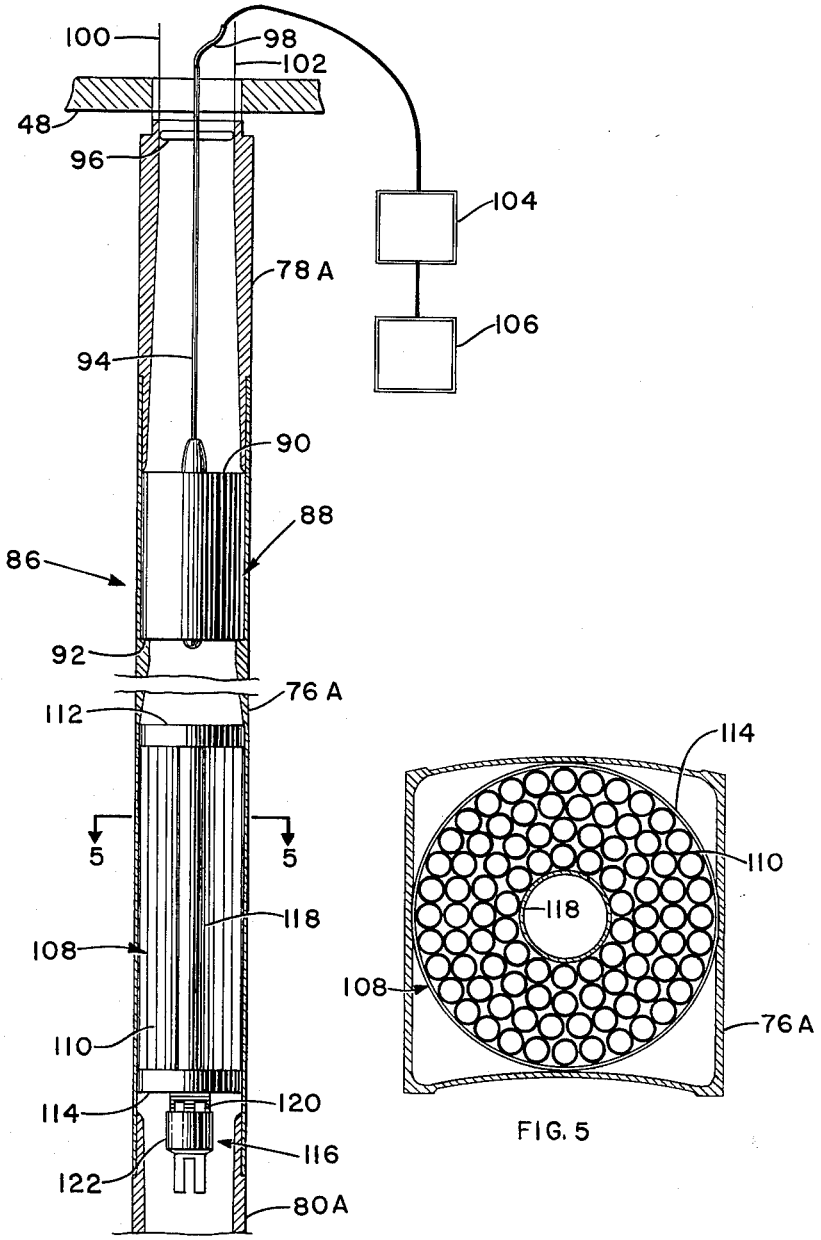
FIG. 4
FIG. 5
INVENTORS
JOSEPH M. SAVINO
CHESTER D. LANZO
BY
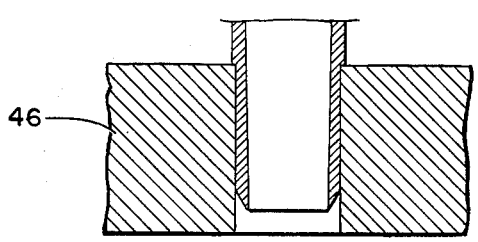
ATTORNEYS

United States Patent Office 3,205,141
Patented Sept. 7, 1965

3,205,141
SIMULATED FUEL ASSEMBLY
Joseph M. Savino, Berea, and Chester D. Lanzo, Rocky River, Ohio, assignors to the United States of America as represented by the Administrator of the National Aeronautics and Space Administration
Filed May 31, 1963, Ser. No. 284,757
5 Claims. (Cl. 176—19)
(Granted under Title 35, U.S. Code (1952), sec. 266)

The invention described herein may be manufactured and used by or for the Government of the United States of America for governmental purposes without the payment of any royalties thereon or therefor.

The present invention relates to measuring the flow of fluid through a flow passage having known overall pressure drop versus flow rate characteristics and is concerned with the flow of cooling water in the area occupied by the fuel assemblies in a nuclear reactor. This invention is particularly directed to a simulated fuel assembly containing flow measuring apparatus that is adapted to be mounted in a reactor core.

Before a nuclear reactor can operate satisfactorily at maximum power, the coolant flow in its core must be adequate. The cores of nuclear reactors generally include fuel assemblies arranged in a predetermined fashion. Two flow characteristics of any nuclear reactor that are important to proper cooling are the flow distribution among the fuel assemblies in the core and the transient flows inside the assemblies during the coast-down period after an accidental pump failure.

During normal steady-state operations knowledge of the flow distribution is necessary for calculating the heat-transfer characteristics and temperatures throughout the core. When a pump failure occurs, the reactor is shut down simultaneously to prevent it from overheating during the flow coast-down period because of the lack of proper cooling. Although the reactor is shut down, it continues to generate a sizable afterheat by fission product decay which decreases rapidly with time to a low value. If the flow coast-down rate is too rapid, the reactor can overheat and be damaged. For this reason, it is very important to know accurately how rapidly the primary flow rate decreases after the pumps stop running.

It has been proposed that the rate of coolant flow be measured by a flow meter mounted in series with a typical fuel assembly. Such a combined unit is installed in the reactor core and is used to measure the flow rate through the unit. This arrangement has a disadvantage in that it fails to measure the true flow at the location where it is installed because the flow meter increases the overall flow resistance of the assembly. Thus, the overall pressure loss versus flow rate characteristics of the combined unit are not the same as those of a typical fuel assembly.

This problem has been solved by utilizing a flow measuring instrument in the form of a simulated fuel assembly which comprises a housing that encloses both a turbine type flow meter and a flow resistor in the form of a cluster of elongated tubes. The housing has a configuration that is substantially identical with that of a typical fuel assembly so that the instrument may be readily substituted for any fuel assembly in the reactor core. The flow resistor includes a flow adjustment so that the overall pressure loss versus flow rate characteristics of the instrument can be made identical with those of the fuel assembly.

It is, therefore, an object of the present invention to provide a flow measuring instrument in the form of a simulated fuel assembly which measures accurately, quickly, and easily the coolant flow rate through the inside of each fuel assembly positioned in a reactor core under steady and transient flow conditions.

Another object of the invention is to provide an instrument for measuring coolant flow in a nuclear reactor core which is compact in size and exhibits substantially the same overall pressure loss versus flow rate characteristics as a typical reactor fuel assembly.

A further object of the invention is to provide a fluid flow measuring device which is extremely accurate and has a short response time to changes in flow.

Other objects of the invention will be apparent from the specification which follows and from the drawings wherein like numerals are used throughout to identify like parts.

In the drawings:

FIG. 4 is an enlarged sectional view of a simulated fuel assembly constructed in accordance with the invention; and FIG. 5 is a sectional view taken along the line 5—5 in FIG. 4.

Figure 1:
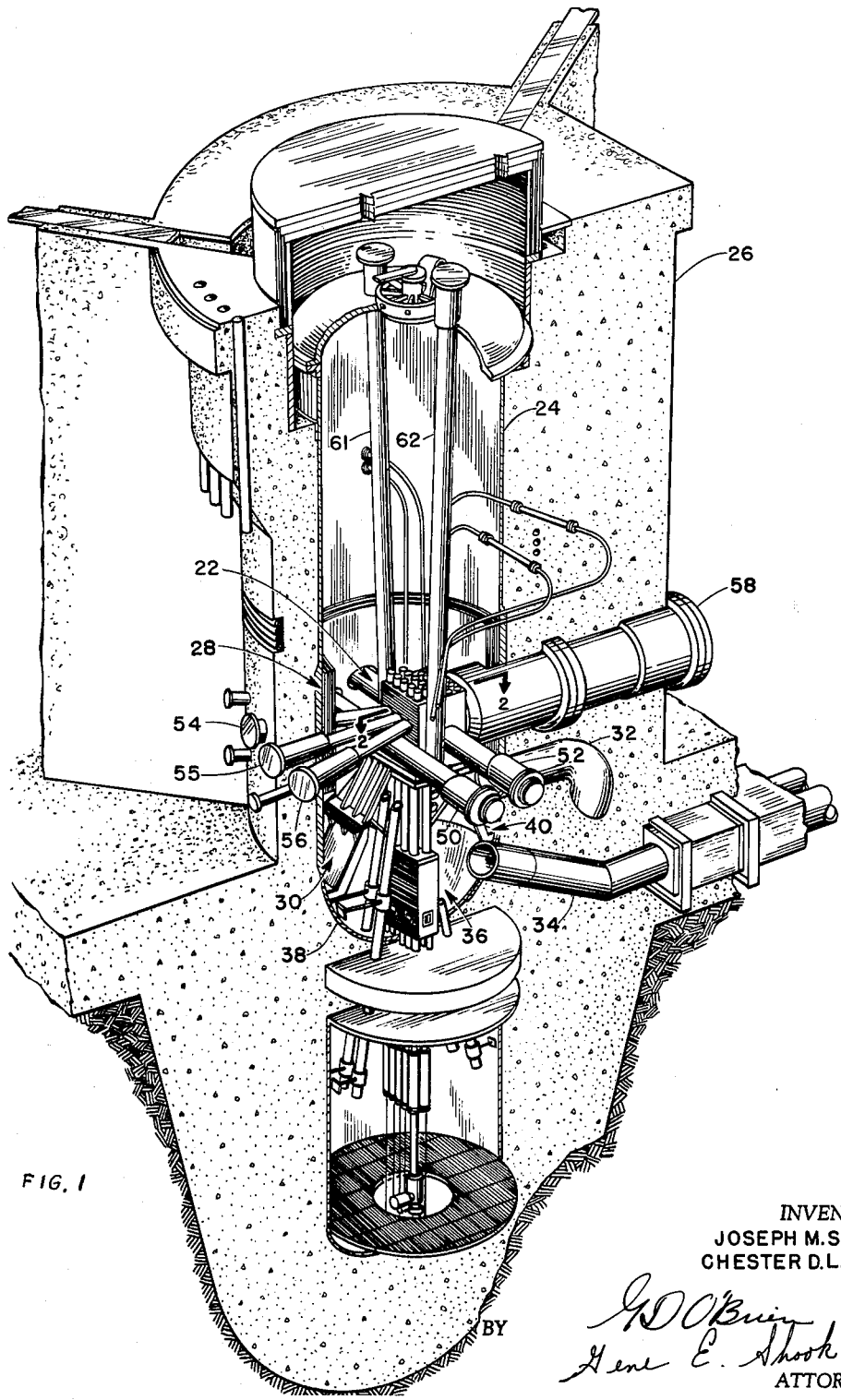
FIG. 1 is a cutaway perspective view of a containment tank that encloses a typical nuclear reactor which utilizes fluid flow measuring instruments constructed in accordance with the present invention to measure coolant flow rates.

The present invention is particularly useful in a nuclear reactor assembly of the type shown in FIG. 1 which is identical with the reactor disclosed in copending application Serial No. 277,402 by John W. Macomber which was filed on May 1, 1963. The reactor 22 is located within a vertically extending pressure tank 24 that is mounted in high density concrete 26 and surrounded by water for biological shielding. Thermal shield 28 in the form of concentric annuli of curved steel plates encircle the reactor 22. Suitable supporting structure in the form of a core pedestal 30 in the lower portion of the pressure tank 24 mounts the reactor 22 in the proper position relative to the tank and shields. The core pedestal 30 also functions to separate cooling water flowing upward from an inlet pipe 32 and downward to an outlet pipe 34 in a core exit chamber 36 formed by the space between the core pedestal 30 and a hemispherical bottom plate 38 in the tank 24.

For full-power operation, the cooling water is supplied by two of the three primary pumps (not shown). When the reactor 22 is shut down, the afterheat is removed by cooling water supplied by a shut down flow circuit connected to the pipes 32 and 34. In both situations, the water entering the tank 24 is fed into a large plenum 40 which is on the opposite side of the pedestal 30 from the chamber 36 and beneath a flow divider plate 42 shown in FIG. 3. This water then flows upward through a 4 x 8 beryllium reflector lattice 44, between the thermal shields 28, or through suitable holes in the plate 42. The flow rate of water through the lattice 44 is dependent upon the number of holes in the plate 42. The water entering the reactor 22 is divided at a lower grid 46 into streams which feed various cooling passages in the lattice 44, and as the water moves upward through an upper grid 48 it is dispersed in the large water volume in the tank 24.

Figure 2:
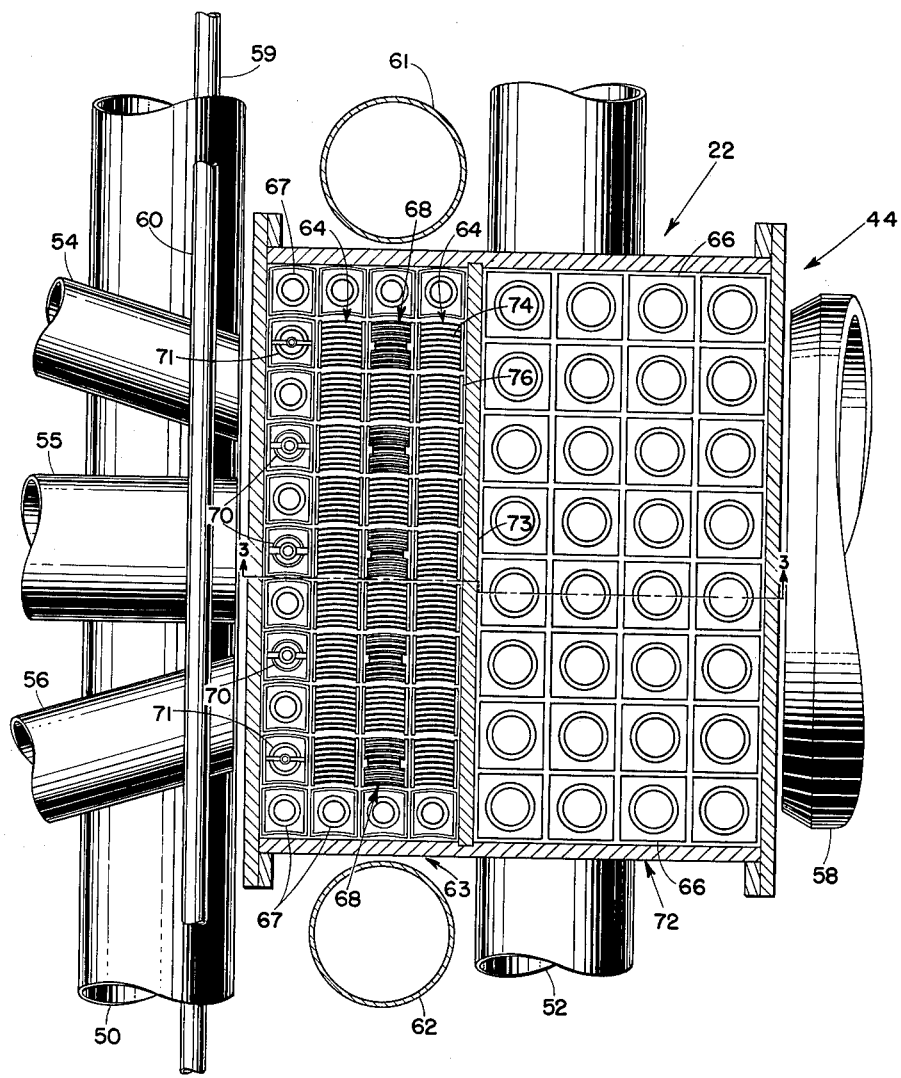
FIG. 2 is an enlarged horizontal sectional view of the reactor taken along the lines 2—2 in FIG. 1.

A pair of parallel tubes 50 and 52 extend horizontally through the pressure tank 24 to form horizontal through holes while three horizontally positioned pipes 54, 55 and 56 extend outward from the reactor 22 through the tank 24 to form horizontal beam holes as shown in FIGS. 1 and 2. A thermal column 58 extends through the opposite side of the pressure tank 24 while a pair of carrier tubes 59 and 60 also may be provided. Vertical tubes 61 and 62 having closed lower ends project downward from the top of the tank 24.

The reactor 22 comprises a boxlike assembly which houses not only a core 63 comprising an active lattice of stationary fuel assemblies 64 arranged in a grid array, but also the reflector lattice 44 which comprises a grid of beryllium blocks 66. The reactor 22 shown in FIG. 2 has twenty-two stationary fuel assemblies 64 and thirty-two beryllium blocks 66 which are all supported by the lower grid 46. Twelve beryllium reflector pieces 67 occupy the outer grid positions shown in FIG. 2 while a row of five control rod assemblies 68 is located in certain of the central grid positions adjacent fuel assemblies 64. An adjacent row of five control rod assemblies is likewise provided, and these control rod assemblies are mounted in certain of the outer grid positions adjacent some of the fuel assemblies 64 and between some of the reflector pieces 67. The control rod assemblies in this adjacent row each contain beryllium, and the row includes three reflector shim rods 70 located between two regulating rods 71.

The aforementioned parts of the reactor 22 are contained within a core box 72 that is divided into two parts by a vertical partition 73. As shown in FIG. 2 a smaller compartment encloses the core 63 of uranium bearing fuel assemblies 64, and the control rod assemblies 68, 70 and 71 pass through this compartment. The larger compartment contains the beryllium reflector elements 66 which form the reflector lattice 44. The various assemblies in the core 63 are so arranged and spaced by the upper grid 48 that the cooling water from the large quiescent reservoir in the tank 24 can pass through them to carry away the generated heat. This flow, which experiences a sharp contraction as it leaves the reservoir above the core 63, feeds into the control rods 68, 70 and 71, the fuel assemblies 64 and the reflector pieces 67. The water flowing through the inside of the fuel assemblies 64 is supplied through holes in the upper grid 48.

Figure 3:
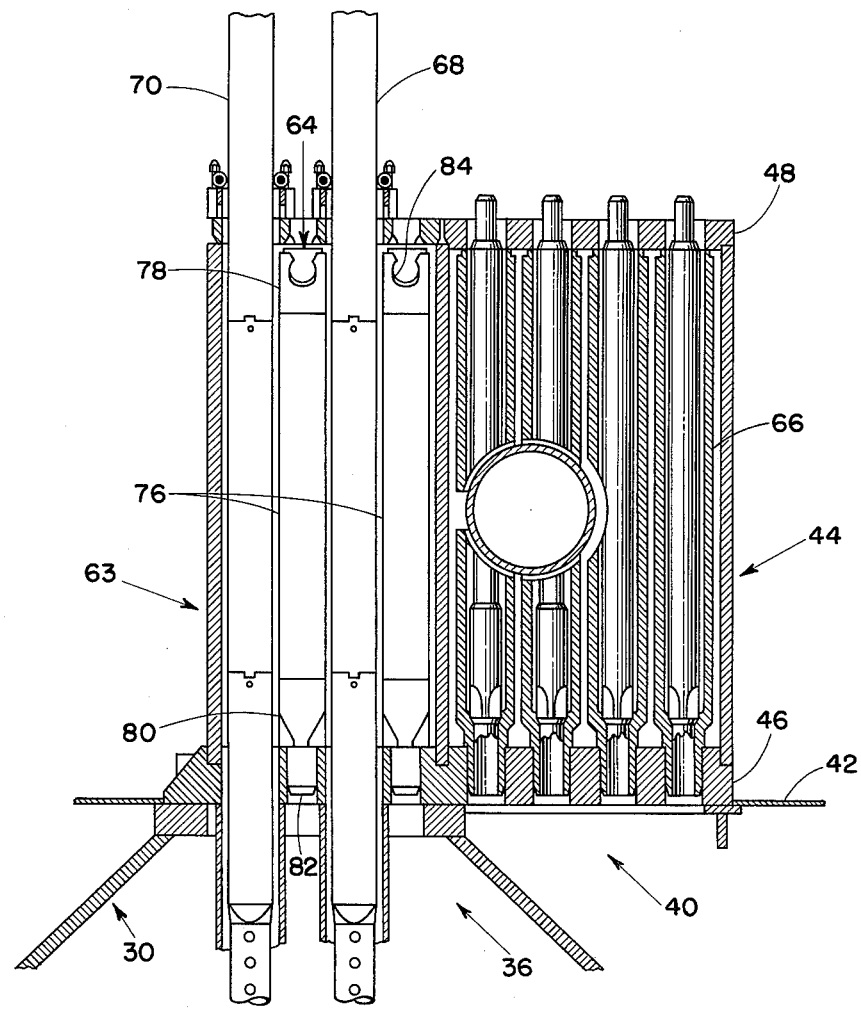
FIG. 3 is a sectional view taken along the line 3—3 in FIG. 2.

Each fuel assembly 64 comprises a brazed assembly of uranium bearing aluminum-clad curved plates 74 as shown in FIG. 2 that are mounted in a housing 76 having a generally rectangular configuration. The housing 76 is hollow to accommodate the passage of cooling water and has a pair of end boxes 78 and 80 mounted at the top and bottom respectively as shown in FIG. 3. The outlet end box 80 converges through a transition from a rectangular portion adjacent the housing 76 to a cylindrical portion 82 that engages a mating hole in the lower grid 46 while suitable recesses 84 are provided in the inlet end box 78 to receive handling tools.

According to the present invention, there is provided a flow measuring instrument 86 shown in FIG. 4 which is in the form of a simulated fuel assembly and is substituted for one of the fuel assemblies 64 in the core 63 to measure the coolant flow through that area. The simulated fuel assembly 86 includes an elongated housing 76A having a configuration shown in FIG. 5 identical with the housing 76 of the fuel assembly 64 shown in FIG. 2. The housing 76A is likewise hollow and has a top opening that mates with an inlet end box 78A that is identical with the box 78 on the upper end of the housing 76. A bottom opening in the opposite end of the housing 76A mates with an outlet end box 80A that is identical with the the box 80. Thus, the simulated fuel assembly 86 may be readily substituted for any of the twenty-two fuel assemblies 64 in the reactor core 63. In fact, more than one simulated fuel assembly 86 may be mounted in the core 63 at one time, and very good results have been obtained when two such instruments are mounted simultaneously in the reactor 22. In this case, one instrument remains in a fixed position while the other instrument is moved to the positions occupied by each of the fuel assemblies 64.

A turbine type flow meter 88 having a flow resistance that is less than that of a typical fuel assembly 64 is mounted within the upper portion of the simulated fuel assembly 86 by inserting it into the upper end of the housing 76A prior to attaching the inlet end box 78A. While the outside of the housing 76A is generally rectangular, the inside is in the form of a cylinder having a diameter slightly greater than that of a cylindrical housing 90 for the flow meter 88 which is properly positioned and supported by a shoulder 92 in the housing 76A. A tubular sheath 94 of stainless steel or the like extends upward from the housing 90 through a spider 96 in the top of the inlet end box 78A. The spider 96 centers and supports the sheath 94 which, in turn, encloses leads from the upstream bearing support for a turbine wheel in the flow meter 88 where a signal pickup is located. The sheath 94 and the enclosed leads extend upward through the upper grid 48 to a rubber tube sheath 98 in the tank 24. Braided wire cables 100 and 102 are secured to opposite sides of the upper portion of the inlet end box 78A and support the leads in the rubber tube sheath 98 under tension to prevent whipping. The output of the flow meter 88 is measured by a pulse rate counter 104 as well as a strip-chart recorder 106 which is used primarily for transient flow tests.

A flow restrictor 108 in the form of a bundle or cluster of elongated tubes 110 of stainless steel or the like is mounted within the housing 78A in series with the flow meter 88. These tubes 110 are connected together with the silver solder and their ends are retained in sleeves 112 and 114. The flow restrictor 108 is inserted in the lower end of the housing 78A, and the upper edge of the outlet end box 80A engages the sleeve 114.

A vernier flow adjustment 116 is provided in the restrictor 108 so that the coolant flow can be altered. The vernier flow adjustment 116 includes a larger tube 118 which extends along the axis of the cluster of smaller tubes 110 and protrudes downward from the sleeve 114 into the outlet end box 80A. To illustrate that the tube 118 is substantially larger than the tubes 110, a typical simulated fuel assembly 86 having a cluster of ninety tubes, each having a length of twelve inches and an inside diameter of 0.22 inch, utilized a central tube 118 with a 0.75 inch inside diameter. The protruding end of the tube 118 has slots 120 formed therein, and a slot area adjusting nut 122 is mounted thereon. Any minor mismatching of the overall pressure loss of the simulated fuel assembly 86 with that of a typical fuel assembly 64 is corrected by an appropriate change in the total area of the slots 120 resulting from rotating the nut 122.

In operation, when it is desired to measure the flow rate of the cooling water supplied by the inlet pipe 32 to the outlet 34 at the position of any of the fuel assemblies 64 in the reactor 22, a simulated fuel assembly 86 is substituted for the fuel assembly 64 in question. This is readily accomplished because of the similarity of configurations between the housings 76 and 76A. Before such a fuel assembly 64 is removed from a reactor core, its pressure loss versus flow rate characteristics are determined experimentally, and the total flow resistance of the simulated fuel assembly 86 is adjusted by the vernier flow adjustment 116 so that the flow restrictor 108 and the turbine meter 88 together produce the same characteristics as the fuel assembly 64. Thereupon the simulated fuel assembly 86 is placed in the core 63 of the reactor 22.

As the cooling water passes from the inlet opening at the end box 78 to the outlet opening at the end box 80 through the housing 76A of the simulated fuel assembly 86, the turbine wheel in the turbine flow meter 88 is rotated to generate a signal which is monitored by the pulse rate counter 104. When the circulating pumps are shut off, the flow characteristics during the coast-down period are likewise accurately determined by the recorder 106 because of the fast reaction time of the metering device.

While the preferred embodiment of the invention has been shown and described, it will be appreciated that various modifications may be made in this disclosed structure without departing from the spirit of the invention of the scope of the subjoined claims. For example, the resistor may be placed ahead of the turbine flow meter if desired.

What is claimed is:

1. In a nuclear reactor of the type having at least one fuel assembly located at a predetermined position therein with means for circulating coolant through said fuel assembly in said position; the improvement comprising
 means for duplicating the pressure loss versus flow rate characteristics of said fuel assembly and measuring the flow rate of said coolant at said position in said reactor when said fuel assembly is removed from said reactor, said means comprising
 a housing having an inlet for admitting said coolant and an outlet for discharging said coolant,
 a flow meter within said housing for measuring the flow of said coolant from said inlet to said outlet, and
 a flow resistor within said housing in the flow path of said coolant from said inlet to said outlet.

2. Apparatus as claimed in claim 1 wherein said housing has a configuration substantially identical with that of said fuel assembly whereby said means is readily substituted for said fuel assembly in said nuclear reactor.

3. Apparatus as claimed in claim 1 including
 a turbine flow meter, and
 means for operably connecting said turbine flow meter to an output detecting means.

4. Apparatus as in claim 1 wherein said flow resistor comprises
 a cluster of elongated tubular members, and
 means for selectively altering the flow of fluid through said tubular members.

5. A simulated reactor fuel assembly comprising,
 an elongated housing adapted to be mounted in a nuclear reactor, said housing having opposed openings therein for the admission and discharge of coolant,
 a turbine flow meter mounted in said housing for measuring the flow of said coolant between said opposed openings, and
 a flow resistor within said housing in the flow path of said coolant.

References Cited by the Examiner
UNITED STATES PATENTS 3,036,965    5/62    Braun _____ 176—56

FOREIGN PATENTS 792,171    3/58    Great Britain.
840,332    7/60    Great Britain.

OTHER REFERENCES

Truxal: "Control Engineer's Handbook," 1958, publ. by McGraw-Hill, pages 15–67 to 15–70.

REUBEN EPSTEIN, *Primary Examiner.*

CARL D. QUARFORTH, *Examiner.*